United States Patent
Kanza et al.

(10) Patent No.: US 12,411,707 B2
(45) Date of Patent: *Sep. 9, 2025

(54) CLOUD RESOURCES FOR SMARTPHONE APPLICATIONS

(71) Applicant: AT&T Intellectual Property I, L.P., Atlanta, GA (US)

(72) Inventors: Yaron Kanza, Fair Lawn, NJ (US); Arun Jotshi, Parsippany, NJ (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,152

(22) Filed: Jul. 1, 2024

(65) Prior Publication Data

US 2024/0354148 A1    Oct. 24, 2024

Related U.S. Application Data

(63) Continuation of application No. 17/368,980, filed on Jul. 7, 2021, now Pat. No. 12,050,925.

(51) Int. Cl.
| | |
|---|---|
| *G06F 9/455* | (2018.01) |
| *G06F 3/0488* | (2022.01) |
| *G06F 3/14* | (2006.01) |
| *G06F 9/4401* | (2018.01) |

(52) U.S. Cl.
CPC ........ *G06F 9/45558* (2013.01); *G06F 3/0488* (2013.01); *G06F 3/1454* (2013.01); *G06F 9/4401* (2013.01); *G06F 2009/45562* (2013.01); *G06F 2009/4557* (2013.01); *G06F 2009/45579* (2013.01)

(58) Field of Classification Search
CPC .............. G06F 9/45558; G06F 3/0488; G06F 2009/45562; G06F 2009/4557; G06F 2009/45579; G06F 9/455
See application file for complete search history.

(56) References Cited

U.S. PATENT DOCUMENTS

| | | | |
|---|---|---|---|
| 9,380,456 B1* | 6/2016 | Lee | H04W 12/088 |
| 2017/0220394 A1* | 8/2017 | Shim | H04W 4/029 |
| 2018/0206060 A1* | 7/2018 | Yazdani | H04L 67/10 |
| 2019/0251216 A1* | 8/2019 | Yim | G06F 30/20 |
| 2021/0120101 A1* | 4/2021 | Alexander | H04L 67/131 |
| 2023/0010231 A1 | 1/2023 | Kanza et al. | |

* cited by examiner

*Primary Examiner* — Dong U Kim
(74) *Attorney, Agent, or Firm* — Guntin & Gust, PLC; Louis Yang

(57) ABSTRACT

Aspects of the subject disclosure may include, for example, instantiating a virtual smartphone in a cloud infrastructure, installing a smartphone application on the virtual smartphone, receiving input sensor data from a physical user device, providing the input sensor data to the smartphone application on the virtual smartphone, receiving output data from the smartphone application on the virtual smartphone, and providing the output data to the physical user device. Other embodiments are disclosed.

20 Claims, 8 Drawing Sheets

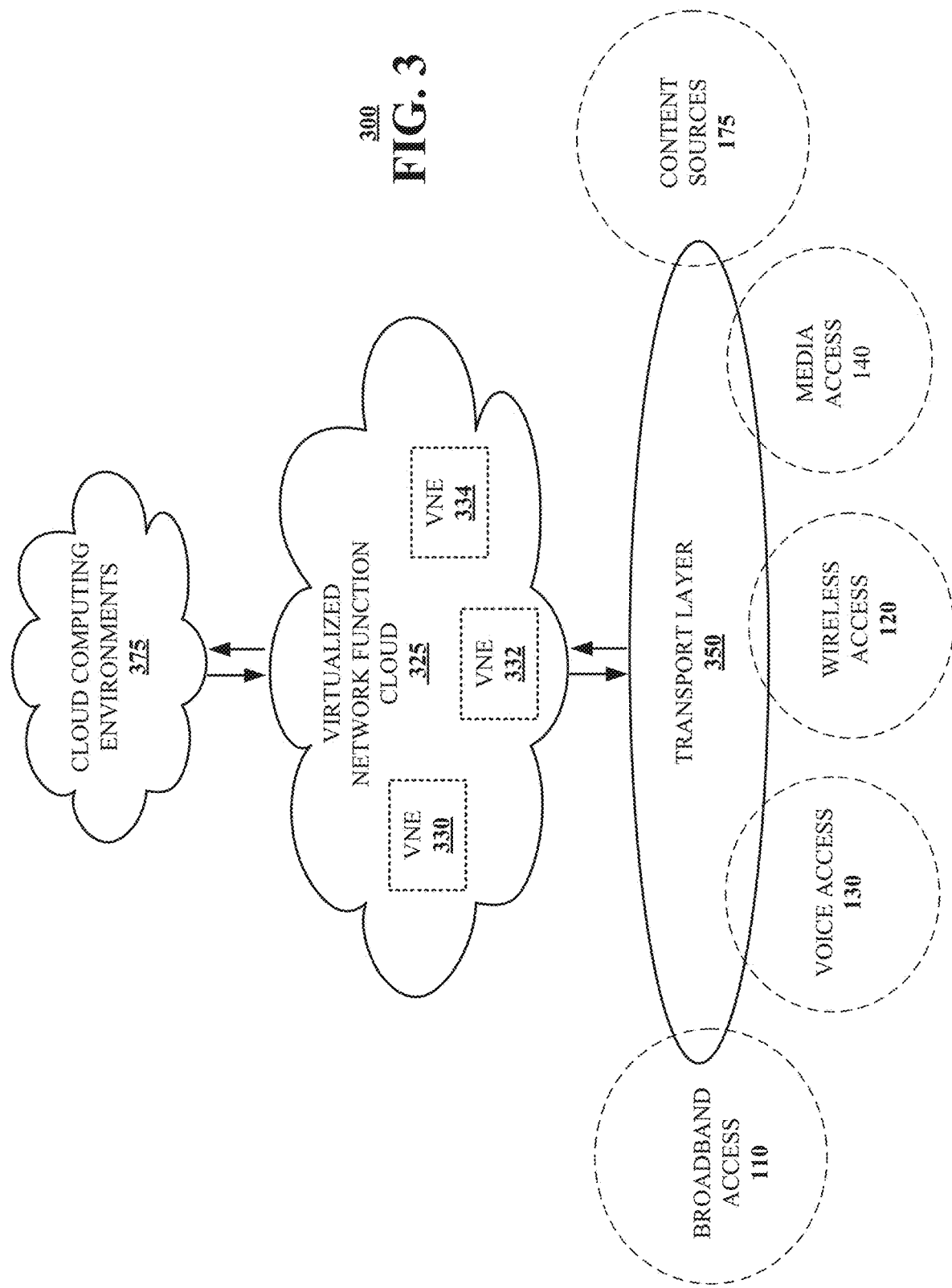

CLOUD RESOURCES FOR SMARTPHONE APPLICATIONS

CROSS-REFERENCE TO RELATED APPLICATION

This application is a continuation of and claims priority to U.S. patent application Ser. No. 17/368,980 filed Jul. 7, 2021. The contents of the foregoing are hereby incorporated by reference into this application as if set forth herein in full.

FIELD OF THE DISCLOSURE

The subject disclosure relates to the use of cloud resources with smartphones and smartphone applications.

BACKGROUND

Smartphones typically run applications, or "apps" on processors that are resident within the smartphone. An app running on a smartphone may communicate with a database or a backend process that is running on a server separate from the smartphone. For example, a smartphone may execute a social media application that interacts with a backend database that is resident on a server. Typically, the smartphone shoulders a significant percentage of the overall processing burden to allow a reasonably fast response time and an acceptable user experience. Over time, smartphone applications are becoming larger and more demanding of computing resources, and smartphones are being built with more processing power and more memory (and are also becoming more expensive) to keep up.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
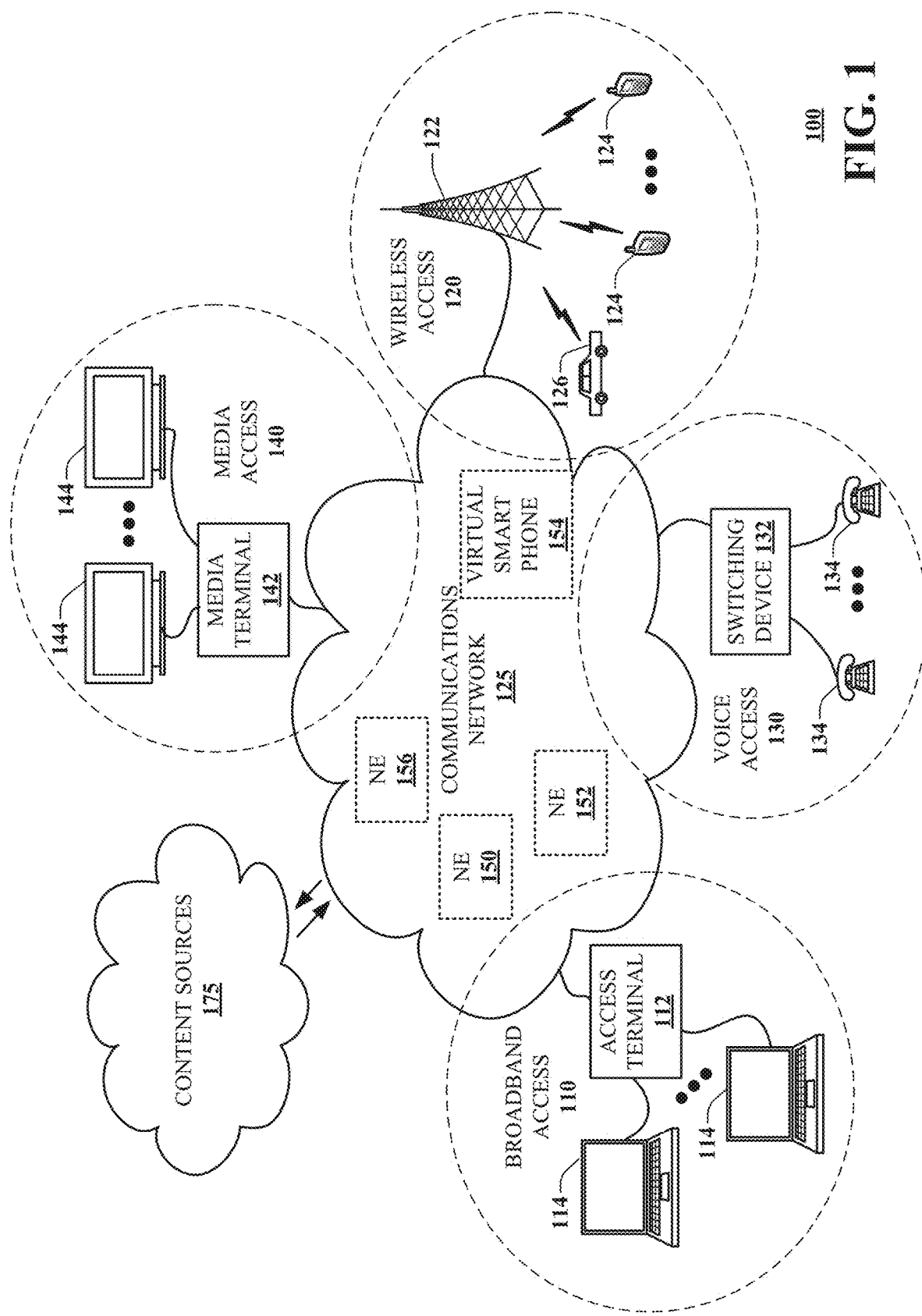
FIG. 1 is a block diagram illustrating an exemplary, non-limiting embodiment of a communications network in accordance with various aspects described herein.

The subject disclosure describes, among other things, illustrative embodiments for a virtual smartphone running on a cloud infrastructure to interact with a physical user device. Other embodiments are described in the subject disclosure.

One or more aspects of the subject disclosure include a device that comprises a processing system including a processor; and a memory that stores executable instructions that, when executed by the processing system, facilitate performance of operations. The operations may include instantiating a virtual smartphone in a cloud infrastructure; installing a smartphone application on the virtual smartphone; receiving input sensor data from a physical user device; providing the input sensor data to the smartphone application on the virtual smartphone; receiving output data from the smartphone application on the virtual smartphone; and providing the output data to the physical user device.

One or more aspects of the subject disclosure include a non-transitory, machine-readable medium, comprising executable instructions that, when executed by a processing system including a processor, facilitate performance of operations. The operations may include instantiating a virtual smartphone in a cloud infrastructure; installing a smartphone application on the virtual smartphone; receiving input sensor data from a physical user device; providing the input sensor data to the smartphone application on the virtual smartphone; receiving output data from the smartphone application on the virtual smartphone; and providing the output data to the physical user device.

One or more aspects of the subject disclosure include a method that may include instantiating, by a processing system including a processor, a virtual smartphone in a cloud infrastructure; installing, by the processing system, a smartphone application on the virtual smartphone; receiving, by the processing system, input sensor data from a physical user device; providing, by the processing system, the input sensor data to the smartphone application on the virtual smartphone; receiving, by the processing system, output data from the smartphone application on the virtual smartphone; and providing, by the processing system, the output data to the physical user device.

Additional aspects include wherein the instantiating the virtual smartphone in the cloud infrastructure comprises starting a smartphone operating system in a container, wherein the receiving input sensor data comprises receiving data generated by a touchscreen of the physical user device, wherein the receiving input sensor data comprises receiving data representing a location of the physical user device, wherein the providing the output data comprises providing data to be displayed on a touchscreen of the physical user device, wherein the installing the smartphone application on the virtual smartphone comprises installing a social media application, and/or wherein the operations further comprise receiving an indication that the physical user device has been requested to install the smartphone application, and wherein the installing the smartphone application on the virtual smartphone is in response to the indication that the physical user device has been requested to install the smartphone application.

Referring now to FIG. 1, a block diagram is shown illustrating an example, non-limiting embodiment of a system 100 in accordance with various aspects described herein. For example, system 100 can facilitate in whole or in part instantiating a virtual smartphone in a cloud infrastructure; installing a smartphone application on the virtual smartphone; receiving input sensor data from a physical user device; providing the input sensor data to the smartphone application on the virtual smartphone; receiving output data from the smartphone application on the virtual smartphone; and providing the output data to the physical user device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In various embodiments, the communications network 125 may include a virtual smartphone 154 in communication with one or more physical user devices such as mobile devices 124, audio/video display devices 144, data terminals 114, and the like. Virtual smartphone 154 may run on an emulator that emulates a smartphone operating system such as Android™ or iOS®. Android is a trademark of Google LLC. iOS is a registered trademark of Cisco Systems, Inc, and is licensed by Apple, Inc.

In some embodiments, virtual smartphone 154 runs apps that would otherwise run directly on a smartphone such as mobile device 124. In these embodiments, one or more physical user devices may interact with a user and send and receive data to and from virtual smartphone 154. For example, in some embodiments, mobile device 124 may include one or more input devices capable of receiving input data from a user, and/or one or more output devices capable of providing output data to the user. As a specific example, a touchscreen display on mobile device 124 may receive input data as well as display output data. In another specific example, data terminal 114 may include a microphone and keyboard to receive input data from a user, and may also include a speaker and display screen to provide output data to the user. In some embodiments, the access to the virtual device requires authentication of the user. For example, a user may authenticate to the virtual device over a secured connection between the physical and the virtual device, to protect from eavesdropping by a third party.

In some embodiments, the physical user device interacting with the virtual smartphone may be a lightweight device that includes enough processing power and memory to run a "service app" that requires significantly less processing resources than a smartphone app. For example, a service app may be limited to interacting with sensors and user interface devices, and communicating data to and from the virtual smartphone that runs a smartphone app. By offloading much of the smartphone app processing requirements to the virtual smartphone, the physical user device may be made more inexpensively than a smartphone that requires significantly more processing resources. In addition, by offloading applications to the virtual smartphone and storing data on the cloud, the data and the applications are protected from loss or damage of the physical device. In some embodiments, the user account may have strong security, including frequent updates of the operating system and the security applications, to provide state of the art protection to the virtual device. Managing the security on the cloud may make the security of accounts managed by experts rather than by users and may provide faster reaction to cybersecurity attacks and threats. The physical user device may also include cell phone hardware and software so that the user receives substantially the same user experience as a user that has a classic smartphone.

The communications link(s) between the physical user device and the virtual smartphone may include very fast, low latency links. For example, in some embodiments, a 4G, 5G, or higher generation communication link may provide low enough latency that a user interacting with the physical user device will not notice an appreciable difference between interacting with a smartphone app using a classic smartphone and interacting with a smartphone app running on virtual smartphone 154 using a lightweight physical user device.

In some embodiments, virtual smartphone 154 is resident within a network core such a communications network core 125. In other embodiments, virtual smartphone 154 is resident in a cloud location. For example, a third party service provider may provide cloud infrastructure that include processing and memory resources capable of running smartphone apps. As used herein, the term "cloud infrastructure" refers to any type, amount, or location of cloud resources capable of executing smartphone apps. In some embodiments, the cloud infrastructure includes dedicated hardware servers to run smartphone apps, and in other embodiments the cloud infrastructure includes virtual servers and/or containers that run smartphone emulators and/or smartphone operating systems. Examples of cloud infrastructure include hardware, software, and services provided by Amazon Web Services® and Azure®. Amazon Web Services is a registered trademark of Amazon Technologies, Inc. Azure is a registered service mark of Microsoft Corporation.

Figure 2A:
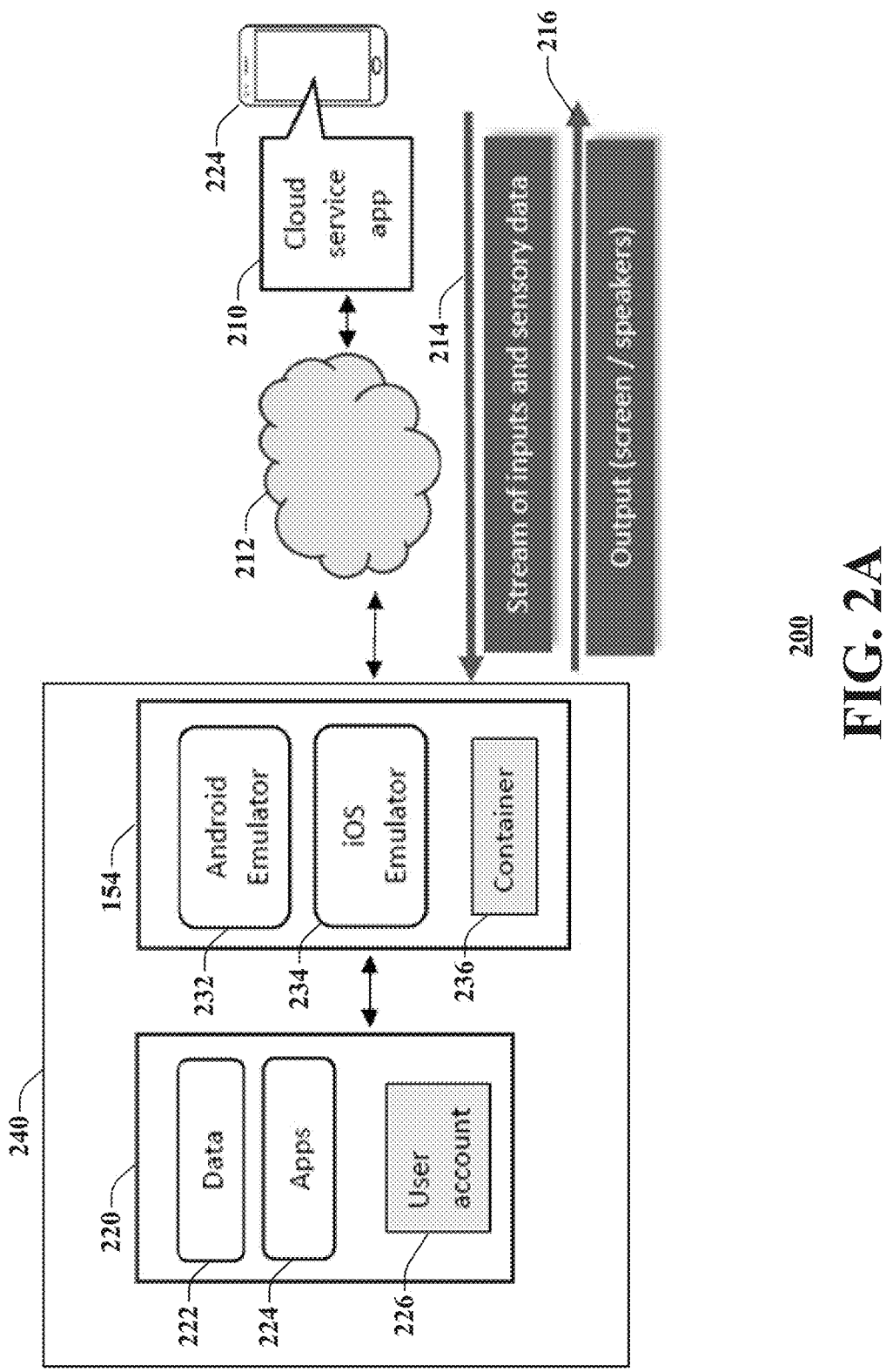
FIG. 2A is a block diagram illustrating an example, non-limiting embodiment of a system that includes a virtual smartphone communicating with a physical user device in accordance with various aspects described herein.

FIG. 2A is a block diagram illustrating an example, non-limiting embodiment of a system that includes a virtual smartphone communicating with a physical user device in accordance with various aspects described herein. System 200 includes physical user device 224, network 212, and cloud location 240. Physical user device 224 may be any type of device capable of interacting with a user. For example, physical user device 224 may be a smartphone, a tablet computer, a laptop computer, a media device, or any other type of device having one or more sensors and/or output devices to interact with the user. In some embodiments, physical user device 224 is a lightweight device that includes significantly less processing power and memory than a classic smartphone. For example, physical user device 224 may include only enough processing power and memory to operate a thin cloud service app 210 that is capable of interacting with sensors and displays within physical user device 224, but that would be insufficient to run many large smartphone apps that exist today.

Cloud service app 210 may collect input data from sensors within physical user device 224 and provide that input data 214 has a stream of inputs and sensory data to cloud location 240. Cloud service app 210 may also interact with one or more output devices within physical user device 224 and provide output data 216 to interact with a user of physical user device 224. Cloud service app 210 may interact with cloud location 240 across a network 212. Network 212 may be any type of network including a communications network such as communications network 125 (FIG. 1) or any other network such as the Internet.

Cloud location 240 may be any location within a cloud infrastructure. For example, cloud location 240 may be an edge location in which computing resources of cloud location 240 are at the edge of a network. Also for example, cloud location 240 may be within a network center of a cloud infrastructure provider. Cloud location 240 includes virtual smartphone 154 and backend server 220. In some embodiments, virtual smartphone 154 may be run on a virtual server within cloud location 240. Also in some embodiments, virtual smartphone 154 may be run in a container 236 within cloud location 240. In some embodiments, virtual smartphone 154 runs an Android emulator 232 on a virtual server or in a container such as container 236. Further, in some embodiments, virtual smartphone 154 may be run on an iOS emulator 234 within a virtual server or container 236.

Backend server 220 includes data 222, apps 224, and one or more user accounts 226. In some embodiments, backend server 220 is the same backend server that is used to communicate with smartphone applications that run on physical smartphones. For example, backend server 220 may be a backend server that supports a social media application, and in embodiments represented by FIG. 2A, backend server 220 communicates with virtual smartphone 154 and may also communicate with physical smartphones running social media applications (not shown).

In operation, physical user device 224 receives input data 214 from a user using sensors within physical user device 224. The input data 214 is communicated through network 212 as a stream of inputs and sensory data to cloud location 240. Within cloud location 240, virtual smartphone 154 receives input data 214. In response to input data 214, virtual smartphone 154 performs operations as if it were a smartphone application running on a classic smartphone and receiving the input data directly from sensors within the smartphone. For example, virtual smartphone 154 may receive input data 214 that represents a user interaction with a touchscreen. In response, virtual smartphone 154 may provide the input data to a smartphone application running on virtual smartphone 154. As a result, the application running on virtual smartphone 154 may produce output data such as output data 216 destined for a display screen or speakers or the like. The output data 216 is communicated to cloud service app 210 across network 212, which then interacts with output devices within physical user device 224 to interact with the user.

In some embodiments, network 212 has sufficiently high bandwidth and sufficiently low latency that the additional time consumed by data transit is acceptable, or even imperceptible, to a user of the remote device.

In some embodiments, applications are installed on virtual smartphone 154 in response to a user interacting with physical user device 224. For example, a user may interact with an online application store and request that an application such as a social media application be installed. In response, the social media application may be installed on virtual smartphone 154 rather than on physical user device 224. Once the application is installed on virtual smartphone 154, a user of physical user device 224 may interact with the application on virtual smartphone 154 in the same manner that a user of a classic smartphone may interact with an application installed on the smartphone itself.

In some embodiments, a single physical user device 224 may interact with multiple virtual smartphones 154 within cloud location 240. For example, a particular user may have an Android smartphone installed as a virtual smartphone within cloud location 240, and may also have an iOS smartphone installed as a virtual smartphone on cloud location 240, and may interact with both of these virtual smartphones using a single physical user device 224. In other embodiments, a user of physical user device 224 may have multiple Android virtual smartphones and multiple iOS virtual smartphones instantiated within cloud location 240.

In some embodiments, a user may have multiple physical user devices 224 that may interact with virtual smartphone 154. For example, a user may have a single virtual smartphone 154 installed or instantiated within cloud location 240 and may have one or more different types of physical user devices 224 capable of interacting with the virtual smartphone. For example, a user may have a virtual smartphone 154 instantiated in cloud location 240 that runs a social media application and may have a first physical user device that is a handheld smartphone look alike capable of communicating with the social media application on virtual smartphone 154, and may also have a tablet computer as a physical user device 224 also capable of communicating with the social media application on virtual smartphone 154. In still further embodiments, a user may have a laptop computer as a third physical user device 224 capable of communicating with the social media application on virtual smartphone 154. In these embodiments, the relationship between virtual smartphones within the cloud location 240 and physical user devices in possession of the user may have a one-to-many relationship, a many-to-one relationship, or a many-to-many relationship. Various embodiments, having applications and data on the cloud facilitate integration between applications of different users. For example, when users share photos and movies with other users, there is no need to send the information between the devices because it is already on the cloud. It may also be easier to share documents, presentations, and other files between accounts while still supporting update capabilities or to create shared social-media accounts.

In some embodiments, a user of physical user device 224 may be associated with one or more user accounts 226. For example, a user of physical user device 224 may be associated with a single user account, and a single virtual smartphone 154 may also be associated with that single user account, such that when the user of physical user device 224 interacts with virtual smartphone 154, it is doing so under a single user account 226. In other embodiments, a user of physical user device 224 may be associated with multiple user accounts. In these embodiments, a single virtual smartphone 154 may have applications associated with these multiple user accounts. For example, an Android smartphone running as virtual smartphone 154 may have multiple email accounts each having a separate user account. The user of physical user device 224 may interact with each of these multiple user accounts on the single Android virtual smartphone 154. In other embodiments, different user accounts may be associated with different virtual smartphones instantiated at cloud location 240. For example, a user of physical user device 224 may interact with an Android virtual smartphone 154 having a first user account 226, and may also interact with an iOS virtual smartphone 154 having a second user account 226. Also for example, a user may have one virtual smartphone 154 for personal use, and another virtual smartphone 154 for business use. A single (or multiple) physical user device(s) may access both virtual smartphones, thereby allowing a single physical user device to be shared among multiple accounts. If one account is to be removed (e.g., if an employee terminates an employment relationship), one virtual smartphone 154 may be removed, which removes the user's ability to access that particular account. In these embodiments, the relationship between the number of virtual smartphones within the cloud location 240, the number of physical user devices in the possession of the user, and a number of user accounts may include any permutation between one-to-one-to-one and many-to-many-to-many.

In some embodiments, the same apps may be installed on multiple virtual smartphones accessible to a particular user, and in other embodiments, one or more different apps may be installed on multiple virtual smartphones accessible to a particular user. For example, a user may have access to a first virtual smartphone with business apps installed (e.g., virtual private network, office productivity apps, enterprise apps, etc.) and may have access to a second virtual smartphone with personal apps installed (e.g., social media, games, messaging, etc.).

In some embodiments, multiple virtual smartphones may utilize identical identification information (e.g., telephone number, IMSI, etc.) and in other embodiments, multiple virtual smartphones may utilize different identification information. For example, in some embodiments, a user have access to an Android virtual smartphone and an iOS virtual smartphone that have different identification information, and in other embodiments, a user have access to an Android virtual smartphone and an iOS virtual smartphone that have identical identification information. In other embodiments, multiple Android virtual smartphones may be instantiated for the purpose of having different smartphones with different OS versions (e.g., a first Android virtual smartphone with the latest OS version, and a second Android virtual smartphone with an older OS version). These multiple virtual smartphones may have the same or different identification information.

As described herein, fast communications links such as 5G may support executing smartphone apps on the cloud, so that storage and computations for smartphones, light IoT devices and handheld devices may be conducted remotely. In various embodiments, applications and data are stored on the cloud, rather than on the smartphone, and the apps are executed on remote virtual machines. As a result, users are not limited by the computation power and storage capacity of their physical device and may instead execute smartphone apps on the remote server. Further, by executing applications on the cloud, Android users may execute iOS apps and vice versa, with no issues of compatibility and without coping with apps that are not supported anymore.

As described above, cloud services for smartphones may include a frontend app such as a cloud service app, and a backend service such as backend service 220, which may be connected via a secured fast network, with low latency and high bandwidth, such as 5G.

The backend service may include containers, e.g., using docker, that may execute iOS and Android emulators. Each user may have one or more accounts with data and apps. Apps associated with a user account may be executed in the container on the cloud. The backend service may securely send data and instructions to the output of the physical user device (e.g., screen and speakers/earbuds). The physical user device collects input and sends that to the backend service.

The frontend app may run on the physical user device. It may collect input from the user and from sensors and sends that as a stream to the backend service. The input may include information from a touchscreen and from sensors such as GPS, accelerometer, gyroscope, magnetometer, biometric sensor, etc.

In some embodiments, the frontend application may be a single application that interacts with all applications installed in the cloud, and in other embodiments each application installed in the cloud has a corresponding frontend app that runs on the physical user device. In either of these embodiments, the frontend app may be limited to interacting with sensors and other hardware and communicating with the actual smartphone application that is running in the cloud.

Various embodiments allow any type of device to interact with any type of smartphone app. For example, a smartphone application running on an Android emulator may communicate with an end user device running iOS or vice versa. In addition, in some embodiments, a single application running in the cloud may interact with multiple different end user devices. For example, a single social media application running on an emulator in the cloud may interact with a user's smartphone, a user's tablet, a user's laptop computer, or the like. Also for example, a user may use one large device when at home and another smaller device when out, (e.g., when jogging or driving). Different physical user devices may be different capabilities (e.g., may be limited to just earbuds, or to a device with or without a phone). This may obviate the need to install multiple copies of smartphone apps on different devices.

In some embodiments, a frontend app may act as a virtual container. For example, some applications need a very low latency, e.g., games. For such applications, the latency of remotely executing them on the cloud might cause too much delay in reactions to user input. To solve this, the frontend app may serve as a virtual container, in the same way that web browsers execute locally JavaScript code that is downloaded ad hoc from a remote server (with no installation). When a game is started, the frontend app may download the code from the cloud service, execute it in the app and execute a supporting backend computation on the remote cloud service. In these embodiments, the game installation and all the data may still be on the cloud. Execution may be partially on the cloud and partially on the physical user device, where the code that runs on the cloud may execute the heavy computations and the code on the local app may react fast to user input.

To illustrate the various embodiments, consider a user that executes a smartphone app on the remote cloud service, e.g., a social media app. As described above, the app may run in a container on the cloud. Images and text that are presented on a screen of the physical user device may be sent from the app running on the virtual smartphone to the physical user device, along with the input specification (e.g., requesting the physical user device to send its GPS location, orientation, and any touch on the touchscreen). The input may then be sent to the app running on the virtual smartphone, the app executes the changes remotely and sends the new screen content to the physical user device. On the physical user device, the local cloud service app may (1) make the connection with the remote service, (2) present content to the user, (3) get local sensor data from the device and send that to the remote app that is running on the cloud, (4) get content updates from the cloud and present that on the device. For apps that stream media, e.g., video or music, the local app may manage a local buffer to prevent interruptions in the stream.

By connecting the physical user device to suitable input-output devices, it may be possible to use the physical user device as a work tool like a laptop, because the computation power and the storage are what the cloud provides, not the capabilities of device itself. For example, the user may connect the physical user device (e.g., a lightweight phone device) to a widescreen monitor, a keyboard, and a mouse and use them to interact with the applications on the cloud. With suitable glasses that present a wide screen and a virtual keyboard as augmented reality, the user may work from places that do not provide any infrastructure other than a 5G connection, e.g., a hotel room. Other types of input-output devices may also be used.

Some embodiments include support for switching between connections that have different bandwidth and/or latency (e.g., between 5G connections and 4G connections). For example, in places with no support for 5G, a physical user device may be limited to cellular connections with lower bandwidth and higher latency (e.g., 4G). Remote applications in which latency is not a major concern may still be supported by using 4G. In some embodiments, an application may include a lightweight local version that can be executed locally (e.g., an application with less functionality). For example, a social media application may include a heavyweight version with rich functionality and a lightweight version with less functionality. In these embodiments, the heavyweight version of the social media application may run on the cloud in places with 5G coverage, and the lightweight version may be run on the cloud in places where the network is slower or less reliable.

To further illustrate the various embodiments, consider a user that wants to use a physical user device for creating and editing a video of a family event. This might be a 10-minute video or a 2-hour video. The following are three traditional options to do that, and their limitations. In various embodiments, the video is captured by a camera on the physical user device and streamed in real time using 5G to the user's secured virtual device, e.g., on AWS or Azure, without storing the video data on the user's physical user device at all. A video editing app may be installed on the virtual device, on the cloud, avoiding using a third-party online service. The video may be edited on the virtual device, where storage and processing power are provided by the cloud. When the user wants to present the edited video, this video is already in the virtual device on the cloud, and it is presented from there.

Figure 2B:
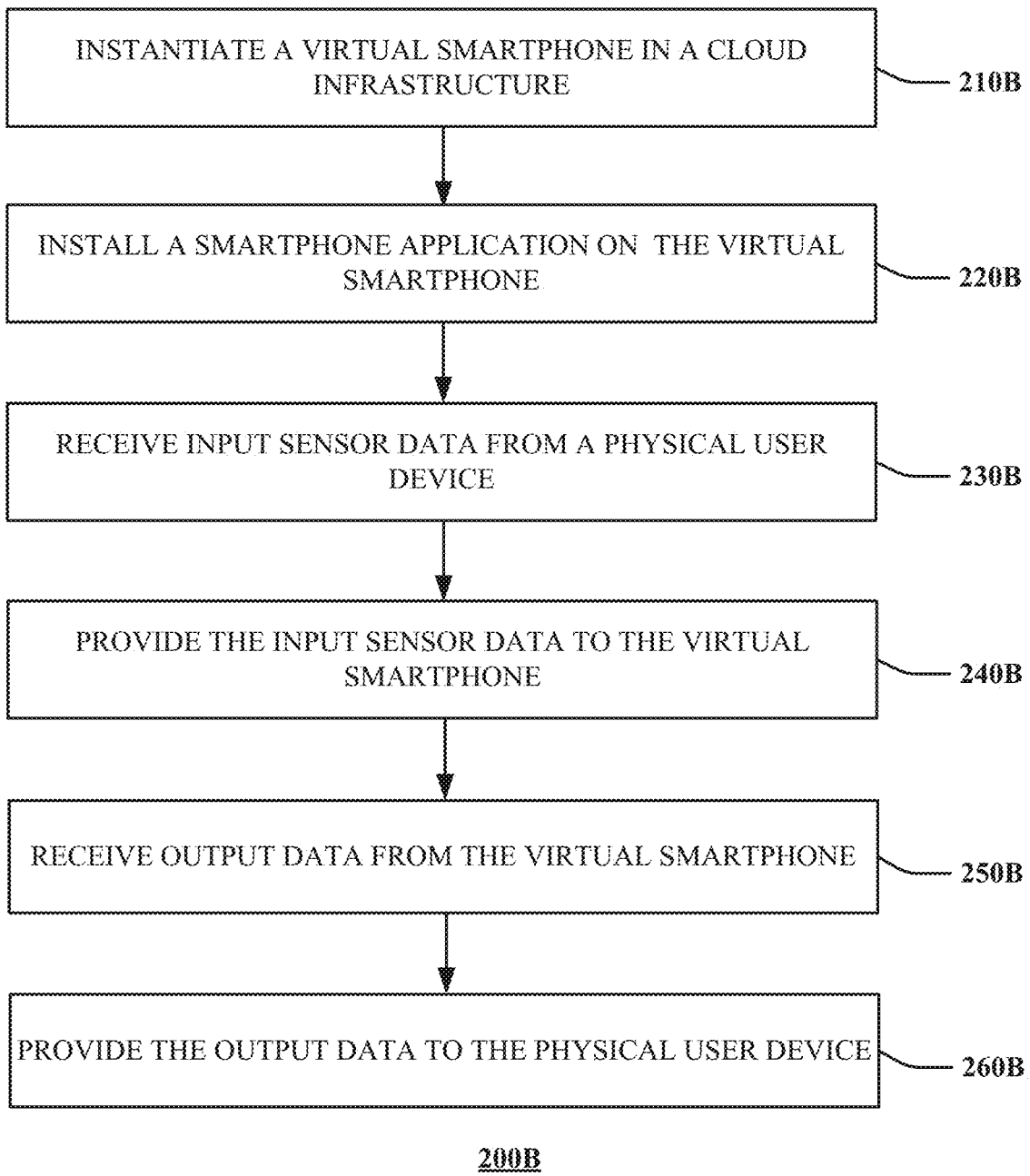
FIGS. 2B and 2C depict illustrative embodiments of methods in accordance with various aspects described herein.

FIG. 2B depicts an illustrative embodiment of a method in accordance with various aspects described herein. In some embodiments, the operations of method 200B may be performed by a process running at a cloud location within a cloud infrastructure. For example, the actions of method 200B may be performed by a cloud service provider, any processing device within a cloud infrastructure, or any processing device within a particular cloud location, such as cloud location 240. At 210B of method 200B, a virtual smartphone is instantiated in a cloud infrastructure. In some embodiments, this corresponds to a virtual machine being booted at a cloud location such as cloud location 240, a container such as container 236 being started within a virtual machine, a smartphone emulator being booted within either a container or a virtual machine, or any combination of the above. For example, referring back to FIG. 2A, a smartphone emulator such as Android emulator 232 may be started within container 236 to instantiate an Android virtual smartphone 154 within cloud location 240. Also for example, a smartphone emulator such as iOS emulator 234 may be started within container 236 to instantiate an iOS virtual smartphone 154 within cloud location 240.

At 220B, a smartphone application is installed on the virtual smartphone. In some embodiments, this is the result of a user of a physical user device visiting an online application store and requesting that a smartphone application be installed. In some embodiments, in response to a user requesting that an application be installed, the application may be downloaded to the physical user device for installation. In other embodiments, in response to the user requesting that an application be installed, the application may be installed on a virtual smartphone such as virtual smartphone 154. In various embodiments, an application within an online application store that is to be installed on a physical smartphone is the same application that is to be installed on a virtual smartphone. For example, a social media application that would run on a classic smartphone in the hands of a user may be the same social media application that is installed on a virtual smartphone in response to a user requesting that the application be installed. In other embodiments, when a user of a physical user device communicating with a virtual smartphone requests that an application be installed, the online application store may detect that a virtual smartphone is requesting the installation and may select a version of the requested application that is tailored to a virtual smartphone rather than a classic smartphone for installation. For example, the application destined for the virtual smartphone may have minor differences related to interacting with sensors rather than interacting with a communications network that will provide and receive data to and from sensors. In other embodiments, the online application store may select among different versions of an application to install on either the virtual smartphone or the physical user device as a function of any criteria (e.g., connection bandwidth, latency, user permissions, location, etc.).

At 230B, input sensor data is received from a physical user device. In some embodiments, this corresponds to a virtual smartphone such as virtual smartphone 154 receiving streams of inputs and sensory data as input data 214 from a physical user device 224. The input data may be collected from any type or number of sensors on physical user device 224. For example, input sensor data may be received from a sensor interacting with a user, such as a touchscreen, a microphone, or the like. Also for example, the input data may represent input sensor data received without direct interaction from a user, such as location data from a GPS sensor, movement data from an accelerometer, for data from any other type of sensor within physical user device 224.

At 240B, the input sensor data is provided to the virtual smartphone. In some embodiments, this corresponds to cloud location 240 providing input and/or sensory data to virtual smartphone 154 after having received the stream of inputs and sensory data from the physical user device. In some embodiments, the virtual smartphone then determines which application running on the virtual smartphone should receive the input sensor data and provides that input sensor data to the appropriate application running on the virtual smartphone. As an example, the input data received may represent a user's finger touching a particular point on a capacitive touchscreen, and virtual smartphone 154 providing that input data to a social media application which may then interpret it as a selection of an item previously displayed on the touchscreen.

At 250B, output data is received from the virtual smartphone. In some embodiments, this corresponds to cloud location 240 receiving output data from virtual smartphone 154. The output data from virtual smartphone 154 may be sourced from an application running on the virtual smartphone 154, and may also be in response to operations performed as a result of previously received input data.

At 260B, the output data is provided to the physical user device. In some embodiments, this corresponds to cloud location 240 providing the output data to cloud service app 210 within physical user device 224 by transmitting it across network 212. Cloud service app 210 may then take the output data and provide it on the appropriate output device on physical user device 224.

Figure 2C:
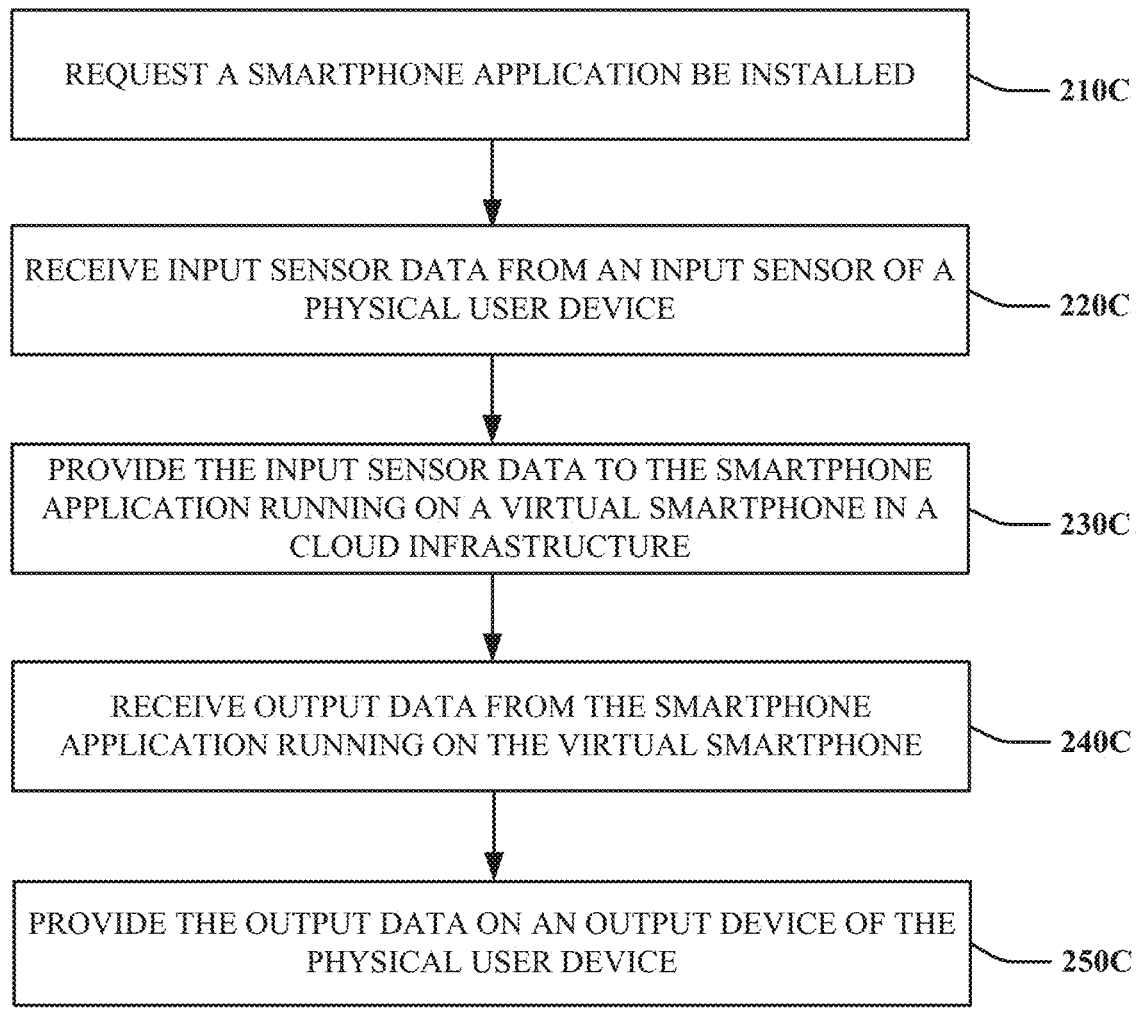

FIG. 2C depicts an illustrative embodiment of a method in accordance with various aspects described herein. In some embodiments, the actions of method 200C may be performed by a physical user device in possession of a user, such as physical user device 224. At 210C a request is made that a smartphone application be installed. In some embodiments, this corresponds to physical user device 224 receiving input data that corresponds to a user performing a request that a smartphone application be installed. This input data may then be sent to a cloud location at which a virtual smartphone has been instantiated.

At 220C, input sensor data is received from an input sensor of a physical user device. In some embodiments, this corresponds to receiving data resulting from interaction with a user. For example, a user may type on a keyboard or perform a gesture on a touchscreen resulting in input sensor data. Also for example, in some embodiments this may correspond to receiving data from sensors that do not necessarily interact directly with a user. For example, a temperature sensor, an accelerometer, a camera, a GPS receiver, a near field communications radio, or the like may produce input sensor data without necessarily interacting directly with the user.

At 230C, the input sensor data is provided to a smartphone application running on a virtual smartphone in a cloud infrastructure. In some embodiments, this corresponds to a physical user device such as physical user device 224 providing input data 214 to an application running on virtual smartphone 154. At 240C, output data is received from the smartphone application running on the virtual smartphone. In some embodiments, this corresponds to an application running on virtual smartphone 154 providing output data 216 to physical user device 224. At 250C, the output data is provided on an output device of the physical user device. In some embodiments, this corresponds to cloud service app 210 providing the output data on an output device such as a touchscreen, speakers, or the like.

While for purposes of simplicity of explanation, the respective processes are shown and described as a series of blocks in FIGS. 2B and 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems, functions, and methods described herein. For example, virtualized communication network 300 can facilitate in whole or in part instantiating a virtual smartphone in a cloud infrastructure; installing a smartphone application on the virtual smartphone; receiving input sensor data from a physical user device; providing the input sensor data to the smartphone application on the virtual smartphone; receiving output data from the smartphone application on the virtual smartphone; and providing the output data to the physical user device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network clement function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers-each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
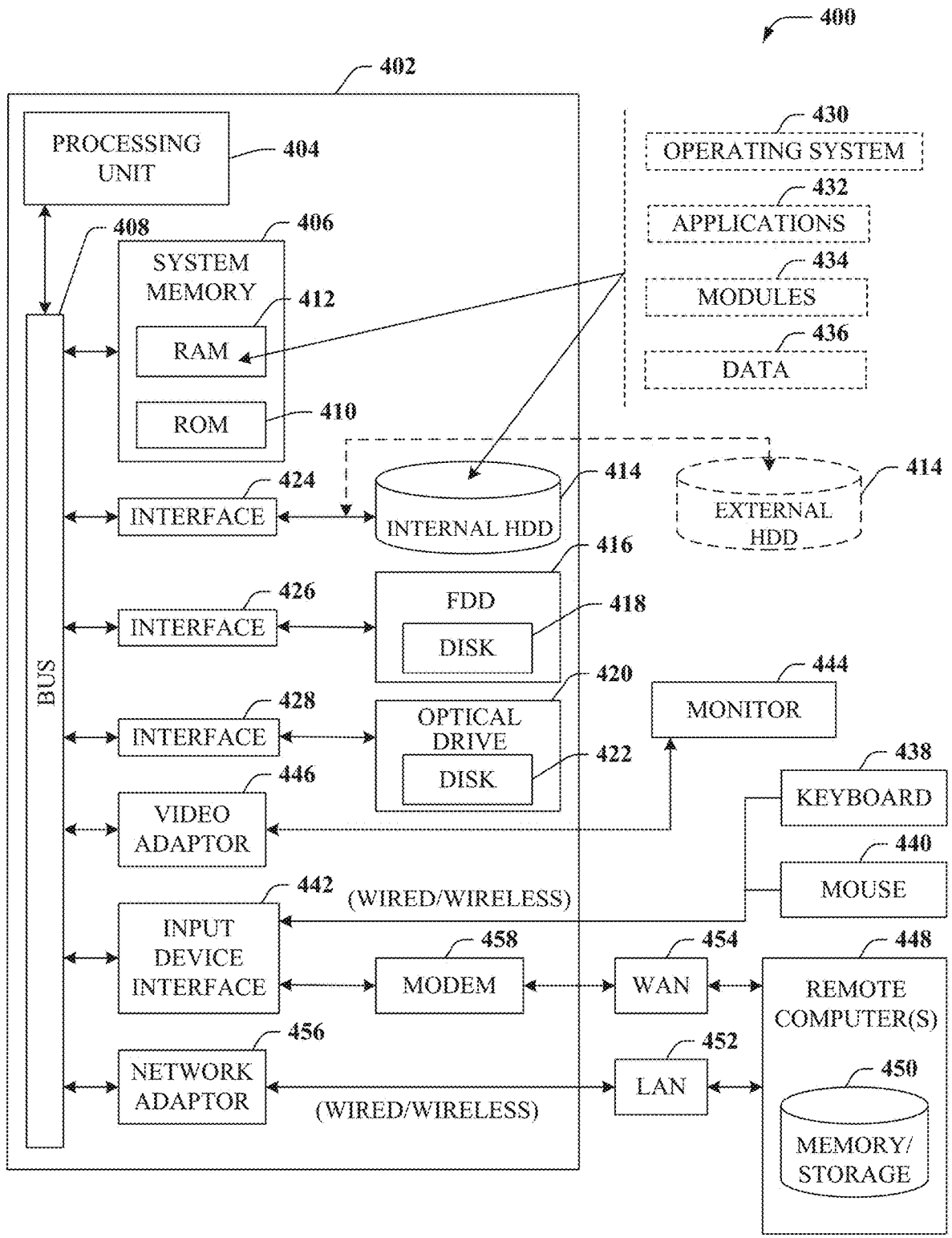
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part instantiating a virtual smartphone in a cloud infrastructure; installing a smartphone application on the virtual smartphone; receiving input sensor data from a physical user device; providing the input sensor data to the smartphone application on the virtual smartphone; receiving output data from the smartphone application on the virtual smartphone; and providing the output data to the physical user device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 5:
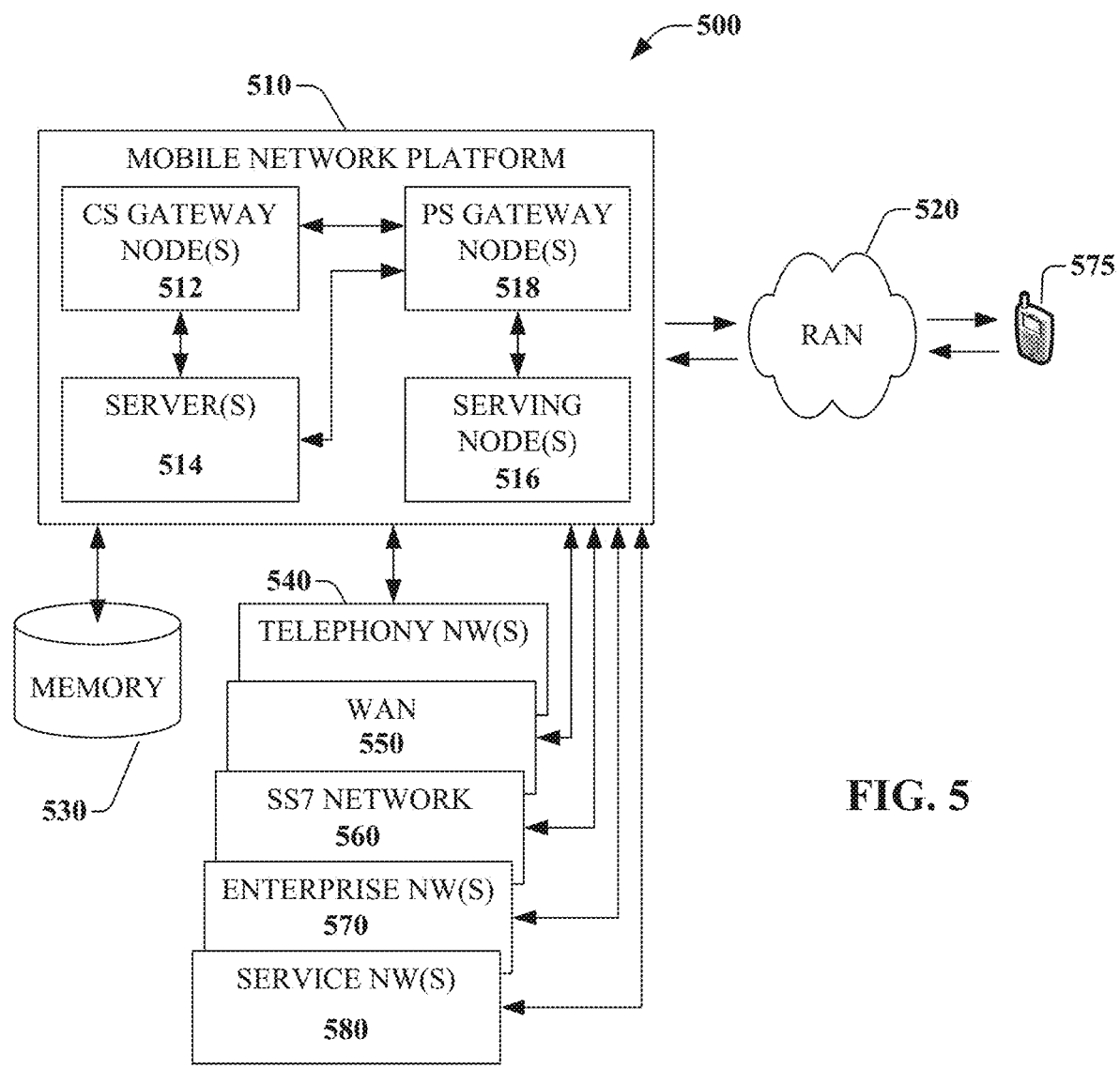
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part instantiating a virtual smartphone in a cloud infrastructure; installing a smartphone application on the virtual smartphone; receiving input sensor data from a physical user device; providing the input sensor data to the smartphone application on the virtual smartphone; receiving output data from the smartphone application on the virtual smartphone; and providing the output data to the physical user device. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
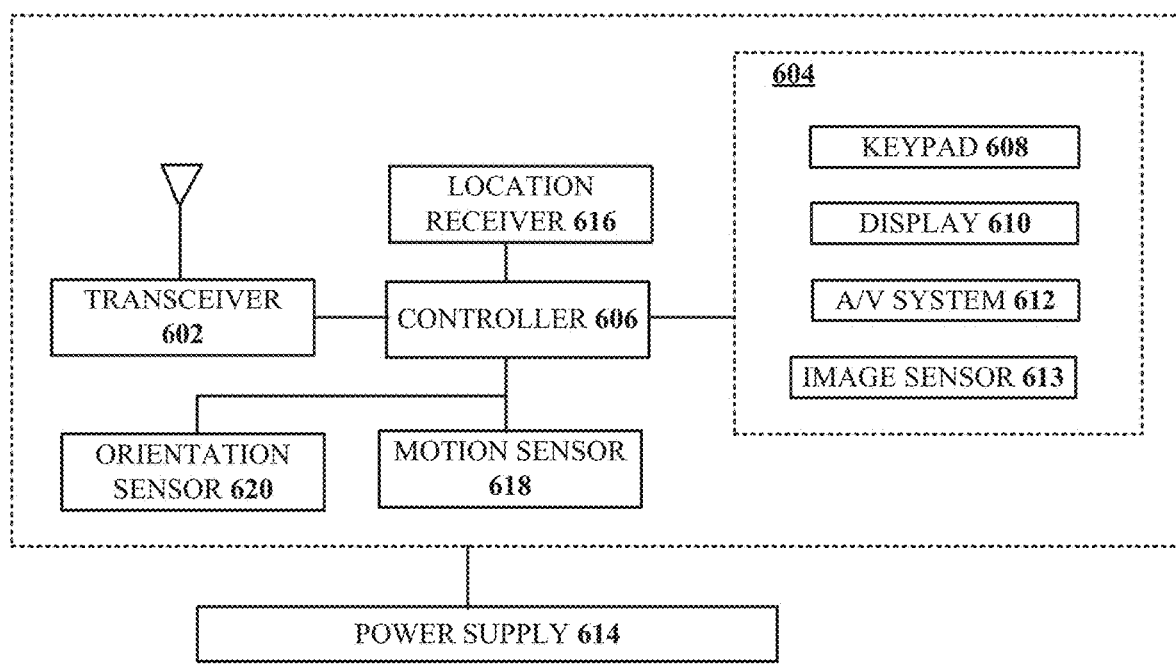
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part instantiating a virtual smartphone in a cloud infrastructure; installing a smartphone application on the virtual smartphone; receiving input sensor data from a physical user device; providing the input sensor data to the smartphone application on the virtual smartphone; receiving output data from the smartphone application on the virtual smartphone; and providing the output data to the physical user device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $X=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   instantiating, for a physical user device, a virtual smartphone in a cloud infrastructure;
   determining a network bandwidth associated with the physical user device, resulting in a determined network bandwidth; and
   based on the determined network bandwidth satisfying a criterion:
      installing a first version of a smartphone application on the virtual smartphone, wherein different versions of the smartphone application that are associated with different network bandwidths are available for installation;
      receiving input sensor data from the physical user device;
      providing the input sensor data to the first version of the smartphone application on the virtual smartphone;
      receiving output data from the first version of the smartphone application on the virtual smartphone; and
      providing the output data to the physical user device.

2. The device of claim 1, wherein the instantiating the virtual smartphone in the cloud infrastructure comprises starting a smartphone operating system in a container, and wherein the operations further comprise:
   based on the determined network bandwidth not satisfying the criterion:
   installing a second version of the smartphone application on the virtual smartphone;
   receiving second input sensor data from the physical user device;
   providing the second input sensor data to the second version of the smartphone application on the virtual smartphone;
   receiving second output data from the second version of the smartphone application on the virtual smartphone; and
   providing the second output data to the physical user device.

3. The device of claim 1, wherein the receiving the input sensor data comprises receiving data generated by a touchscreen of the physical user device.

4. The device of claim 1, wherein the receiving the input sensor data comprises receiving data representing a location of the physical user device.

5. The device of claim 1, wherein the providing the output data comprises providing data to be displayed on a touchscreen of the physical user device.

6. The device of claim 1, wherein the smartphone application comprises a social media application.

7. The device of claim 1, wherein the operations further comprise receiving an indication that the physical user device has been requested to install the smartphone application, and wherein the installing the first version of the smartphone application on the virtual smartphone is also in response to the indication that the physical user device has been requested to install the smartphone application.

8. A non-transitory, machine-readable medium, comprising executable instructions that, when executed by a processing system including a processor, facilitate performance of operations, the operations comprising:
- instantiating, for a physical user device, a virtual smartphone in a cloud infrastructure;
- identifying a network bandwidth associated with the physical user device, resulting in an identified network bandwidth; and
- based on the identified network bandwidth satisfying a criterion:
  - installing a first version of a smartphone application on the virtual smartphone, wherein different versions of the smartphone application that are associated with different network bandwidths are available for installation;
  - receiving input sensor data from the physical user device;
  - providing the input sensor data to the first version of the smartphone application on the virtual smartphone;
  - receiving output data from the first version of the smartphone application on the virtual smartphone; and
  - providing the output data to the physical user device.

9. The non-transitory, machine-readable medium of claim 8, wherein the instantiating the virtual smartphone in the cloud infrastructure comprises starting a smartphone operating system in a container.

10. The non-transitory, machine-readable medium of claim 8, wherein the receiving the input sensor data comprises receiving data generated by a touchscreen of the physical user device.

11. The non-transitory, machine-readable medium of claim 8, wherein the receiving the input sensor data comprises receiving data representing a location of the physical user device.

12. The non-transitory, machine-readable medium of claim 8, wherein the providing the output data comprises providing data to be displayed on a touchscreen of the physical user device.

13. The non-transitory, machine-readable medium of claim 8, wherein the smartphone application comprises a social media application.

14. The non-transitory, machine-readable medium of claim 8, wherein the operations further comprise receiving an indication that the physical user device has been requested to install the smartphone application, and wherein the installing the first version of the smartphone application on the virtual smartphone is also in response to the indication that the physical user device has been requested to install the smartphone application.

15. A method, comprising:
- instantiating, for a physical user device and by a processing system including a processor, a virtual smartphone in a cloud infrastructure;
- determining, by the processing system, a network bandwidth associated with the physical user device, resulting in a determined network bandwidth; and
- based on the determined network bandwidth satisfying a criterion:
  - installing, by the processing system, a first version of a smartphone application on the virtual smartphone, wherein different versions of the smartphone application that are associated with different network bandwidths are available for installation;
  - obtaining, by the processing system, input sensor data from the physical user device;
  - providing, by the processing system, the input sensor data to the first version of the smartphone application on the virtual smartphone;
  - obtaining, by the processing system, output data from the first version of the smartphone application on the virtual smartphone; and
  - providing, by the processing system, the output data to the physical user device.

16. The method of claim 15, wherein the instantiating the virtual smartphone in the cloud infrastructure comprises starting a smartphone operating system in a container.

17. The method of claim 15, wherein the obtaining the input sensor data comprises obtaining data generated by a touchscreen of the physical user device.

18. The method of claim 15, wherein the obtaining the input sensor data comprises obtaining data representing a location of the physical user device.

19. The method of claim 15, further comprising:
- obtaining, by the processing system, second input sensor data from a second physical user device;
- providing, by the processing system, the second input sensor data to the smartphone application on the virtual smartphone;
- obtaining, by the processing system, second output data from the smartphone application on the virtual smartphone; and
- providing, by the processing system, the second output data to the second physical user device.

20. The method of claim 15, wherein the physical user device is connected to different virtual smartphones at different times.

* * * * *